United States Patent [19]
Vael

[11] Patent Number: 6,113,952
[45] Date of Patent: Sep. 5, 2000

[54] PROCESS FOR THE MANUFACTURE OF DEEP-FROZEN, READY FOR BAKING DOUGH PIECES

[75] Inventor: Marc Cyrille Alice Vael, Zele, Belgium

[73] Assignee: N. V. Ceres S.A., Brussels, Belgium

[21] Appl. No.: 08/966,163

[22] Filed: Nov. 7, 1997

Related U.S. Application Data

[63] Continuation of application No. 08/634,127, Apr. 19, 1996, abandoned, which is a continuation of application No. 08/337,422, Nov. 7, 1994, abandoned, which is a continuation of application No. 08/034,400, Mar. 19, 1993, abandoned.

[30] Foreign Application Priority Data

Mar. 20, 1992 [BE] Belgium ................................ 92 03365

[51] Int. Cl.$^7$ ...................................................... A21D 2/00
[52] U.S. Cl. ................................ 426/19; 426/20; 426/62; 426/549
[58] Field of Search ................................ 426/19, 20, 62, 426/18, 27, 61, 549

[56] References Cited

U.S. PATENT DOCUMENTS

| | | |
|---|---|---|
| 3,250,625 | 5/1966 | Thelen . |
| 3,250,626 | 5/1966 | Thelen . |
| 3,255,016 | 6/1966 | Parker . |
| 3,368,903 | 2/1968 | Johnson et al. . |
| 4,374,151 | 2/1983 | Lindstrom et al. . |
| 4,406,911 | 9/1983 | Larson et al. . |
| 4,664,932 | 5/1987 | Yamaguchi et al. . |
| 4,743,452 | 5/1988 | Felske et al. . |
| 5,182,123 | 1/1993 | Edo et al. . |

FOREIGN PATENT DOCUMENTS

| | | |
|---|---|---|
| 0 145 367 | 6/1985 | European Pat. Off. . |
| 0 305 071 | 3/1989 | European Pat. Off. . |
| 49-41556 | 4/1974 | Japan . |
| 57-115130 | 7/1982 | Japan . |
| 62-181730 | 8/1987 | Japan . |
| 1005802 | 9/1965 | United Kingdom . |
| 2102269 | 2/1983 | United Kingdom . |

OTHER PUBLICATIONS

I. Adachi, *Bread Confectionery Dictionary*, Sep. 10, 1980, pp. 678–681.

M. Marraccini, "West Coast Bakery Attributes Its Success to Quality, Research and Timing," in *Baking Industry*, vol. 152, No. 1853 (Jan. 1985), pp. 28–29.

Y. Sakurai, *Foodstuffs Dictionary*, 6th Ed. (1989), pp. 852–853.

W. Nakar, *Bread School*, pub. May 25, 1964, p. 125.

R.C. Whiting, "Addition of Phosphates, Proteins, and Gums to Reduced–Salt Frankfurter Batters," *Journal of Food Science*, vol. 49, No. 5, Sep.–Oct. 1984, pp. 1355–1357.

R.C. Hoseney, "Gas Retention in Bread Doughs," *Cereal Foods World*, May 1984, pp. 305–308.

International Publication No. WO 91/01088, dated Feb. 7, 1991 to Peter Larsen.

Patent Abstracts of Japan, vol. 14, No. 37 (Jan. 24, 1990) & JP A–1273536 (Bonaale, Nov. 1, 1989).

International Publication No. WO 92/11767, dated Jun. 23, 1992 (Milot).

*Primary Examiner*—Leslie Wong
*Attorney, Agent, or Firm*—Watson Cole Grindle Watson, P.L.L.C.

[57] ABSTRACT

Deep-frozen, unfermented raw dough pieces which can be directly baked into croissants and other similar bakery products without thawing or intermediate fermenting include a plurality of fat layers and a plurality of layers of yeast dough, the number of fat layers being greater than 50.

10 Claims, No Drawings

PROCESS FOR THE MANUFACTURE OF DEEP-FROZEN, READY FOR BAKING DOUGH PIECES

CROSS-REFERENCE TO RELATED APPLICATIONS

This application is a continuation of application Ser. No. 08/634,127, filed Apr. 19, 1996, now abandoned, which was a continuation of application Ser. No. 08/337,442, filed Nov. 7, 1994, now abandoned, which was a continuation of application Ser. No. 08/034,400, filed Mar. 19, 1993, now abandoned.

The invention relates to deep-frozen, ready for baking, dough pieces for croissants and similar bakery products, a process for their manufacture and the baked products obtained.

THE PRIOR ART

The traditional manufacture of croissants consists in producing a yeast dough consisting of flour, water, yeast, sugar, salt, butter or margarine, and optionally various known improvers such as an emulsifier, ascorbic acid, an amylase, a hemicellulase and the like, folding this dough so as to obtain a flaky structure, dividing the latter into pieces which are rolled out into a dough piece, fermenting (proofing) the dough pieces so that they increase volume, and, finally, baking them.

The manufacture of deep-frozen croissants is carried out in a manner similar to that of conventional croissants except that an intermediate deep-freezing operation is performed. In fact, there are two principal ways of carrying out the procedure:

freezing the unfermented dough pieces in order to obtain deep-frozen raw dough pieces, or freezing the fermented dough pieces in order to obtain fermented and deep-frozen dough pieces.

In the first case, at the time of use, the dough piece must first be thawed, then fermented, for example for 1 to 2 hours at 30° C., and finally baked.

In the second case, the dough piece may be thawed, then baked, or alternatively baked directly.

These two approaches have their advantages and disadvantages.

The deep-frozen raw dough piece technique makes it possible to store and to handle products with low volume and with a density of the order of 1. However, it has two disadvantages, namely the loss of activity of the yeast during prolonged storage and the need to carry out thawing and fermenting operations before the baking.

The deep-frozen, fermented, raw dough piece technique eliminates these two disadvantages; however, this type of product has a density of the order of 0.2–0.3 and therefore occupies a volume 3 to 5 times greater than deep-frozen raw dough piece for the same mass of material.

It would therefore be desirable to have a deep-frozen raw product which would increase in volume during the baking without the need for a preliminary fermenting step, and which would therefore combine the advantages of both types of prior art products without having their disadvantages.

SUMMARY OF THE INVENTION

The invention aims to provide such a product.

The invention is based on the application, for the production of the flaky structure, of a folding such that a number of fat layers greater than 50 is obtained which is substantially greater than the number of layers normally used during the preparation of conventional fresh or deep-frozen croissants.

More specifically, the invention relates to deep-frozen raw dough pieces which can be directly baked into croissants and other similar bakery products without thawing or intermediate fermenting, comprising a plurality of fat layers and a plurality of layers of yeast dough, which contain a total number of fat layers greater than 50.

In a preferred but optional manner, the dough pieces of the invention contain, in addition, at least one of the following three additives:

an acidifying agent which acts progressively, a thickening and/or gelling agent which retains water, and a lipolytic enzyme.

In an optional but particularly preferred manner, the dough pieces of the invention contain all three of these additives.

According to a variant, the dough pieces comprise, in addition, a plurality of dough layers free of yeast.

The invention also relates to the bakery products obtained by directly baking the deep-frozen raw dough pieces of the invention.

The invention relates, in addition, to a process for the manufacture of deep-frozen raw dough pieces which can be directly baked into croissants or other similar bakery products, without thawing or intermediate fermenting, which comprises the following steps:

a) preparing a yeast dough, optionally containing the abovementioned additives;

b) rolling out the dough obtained into sheet form and applying a layer of fat to it;

c) folding the whole so that the total number of fat layers is greater than 50;

d) rolling out the folded dough until the desired thickness is obtained, and producing the dough pieces from the dough; and e) deep-freezing the dough pieces.

The invention also relates to a process for the manufacture of deep-frozen raw dough pieces corresponding to the variant of dough pieces defined above, which comprises the following steps:

i) preparing a dough free of yeast;

ii) preparing a yeast dough;

iii) rolling out the doughs obtained into sheet form;

iv) preparing a laminated structure comprising at least one sequence consisting, in order, of a layer of yeast dough, a layer of yeast-free dough and a layer of fat, and folding this structure so that the total number of fat layers is greater than 50;

v) rolling out the resulting folded dough until the desired thickness is obtained, and producing dough pieces from the dough; and vi) deep-freezing the dough pieces.

It should be noted that the noted laminated structure may consist of only the defined three-layer structure or may contain additional layers, for example as illustrated in Example 3 below.

In an optional but preferred manner, there is incorporated into the dough used or into at least one of the doughs used, or preferably into both doughs when two different doughs are used, at least one of the following three additives:

an acidifying agent which acts progressively, a thickening and/or gelling agent which retains water, and a lipolytic enzyme.

In a particularly preferred manner, the three additives above are incorporated into the dough or into each of the two doughs.

In a manner which is also preferred, step iv) is carried out so that the yeast dough forms the exterior of the resulting folded mixed dough.

The expression "similar bakery products" is understood to mean products which are generally manufactured from croissant dough, such as rolls with chocolate or raisin fillings, and other Vienna type pastries.

The critical characteristic feature of the invention lies in the folding applied to the dough or to the combined doughs.

Usually, in the manufacture of conventional croissants, the folding is such that the number of fat layers in the dough piece does not exceed 40 and indeed is normally less than this value. According to the invention, it was found that the folding should be more extensive and should be such that the number of fat layers in the dough piece is greater than 50, preferably between 80 and 500, and at best between 80 and 240. With a number of fat layers less than 50, a satisfactory baked finished product is not obtained, and a number of layers greater than 500 is superfluous or even detrimental.

The croissants obtained by using this characteristic feature in the manufacture of deep-frozen dough pieces exhibit satisfactory properties which already make them superior to the croissants obtained from deep-frozen products currently available on the market.

A first optional means which makes it possible to improve the bakery products finally obtained consists in combining a yeast-free dough with the yeast dough. Such a combination is unusual in the domain in question since the manufacture of croissants generally involves the use of only one yeast dough.

These bakery products can also be improved by incorporating at least one of the three additives mentioned above, and preferably the three additives into the original dough, when only the yeast dough is used, or into at least one of the original doughs, and preferably into the two original doughs, when both doughs are used, one containing yeast and the other not.

As acidifying agent which acts progressively, there may be used in particular a glucono-delta-lactone which is available from the company Roquette, Lille, France. The proportion of this acidifying agent to be used can range, as a guide, from 2 to 10 parts by weight per 1000 parts by weight of flour.

An acidifying agent which acts progressively is an agent which, when it is placed in an aqueous medium, is progressively hydrolysed, releasing an acid.

Glucono-delta-lactone, for example, is hydrolysed in aqueous medium within a few minutes with the release of gluconic acid. The higher the temperature, the faster the hydrolysis.

The acidifying agent which acts progressively exerts a delaying effect on the coagulation of starch and as a result, makes it possible to obtain a baked finished product (croissant, for example) with improved texture, which could not be obtained with a normal acidifying agent or in the absence of any acidifying agent.

As thickening and/or gelling agent which retains water, there may be used for example carboxymethylcellulose and its derivatives such as the sodium form; or a polysaccharide such as guar gum, xanthan or an alginate (for example sodium alginate).

The proportion of this agent to be used can range, as a guide, from 2 to 10 parts by weight per 1000 parts by weight of flour.

The role of this thickening and/or gelling agent which retains water is to help to retain the vapors and/or gases released during the fermenting and during the baking so as to obtain an improved development. It also serves to provide water for hydrolysing the acidifying agent which acts progressively, which is optionally present.

As lipolytic enzyme, there may be used especially a lipase or a fatty acid esterase. As a guide, there may be incorporated a quantity of enzyme corresponding to 12 to 120 LCA units per kilogram of flour. The LCA unit is an enzymatic unit defined by the company ROHM in a document referenced 50-1-16-E which is available from this company. The LCA unit is based on a measurement of lipase activity on a glyceryl tributyrate substrate. There is no official standard defining the lipolytic activity.

The lipolytic enzyme is used, for its part, to attack the fat molecules, with the formation of degradation products having emulsifying and/or aromatic properties.

When the three abovementioned additives are used simultaneously, they are advantageously, but not necessarily, premixed with each other before being added to the dough (s).

In addition to the three abovementioned additives, it is possible to add to the dough(s) used for the manufacture of the products of the invention other customary food grade improvers such as for example an emulsifier or the like.

The fat may be a margarine or butter.

The following non-limiting examples will allow the invention to be clearly understood. In these examples, all the parts are indicated by weight, unless otherwise stated.

EXAMPLE 1

Manufacture of Deep-frozen Raw Dough Pieces for Croissant From Yeast Dough Alone A) Recipe for Flaky Yeast Dough 1000 g of bread flour of DUO brand, sold by the company CERES, Brussels, Belgium 80–120 g of sugar 75 g of compressed bakers' yeast (with a dry matter content of about 30–35%)

550 g of water (or 500 g of water+1 egg)

20 g of salt

B) Preparation of the Dough mix the flour and the sugar well add the water, the egg where appropriate, and the yeast, then mix, add the salt, then knead.

It is advisable to ensure that the temperature of this dough does not exceed 20° C.

C) Preparation of the Dough Pieces 1000 g of the dough are taken, it is rolled out into sheet form, and 300–500 g of margarine and/or butter are spread over it, and it is folded 1×2, then 3×3 (that is to say a folding into 2 folds, then 3 successive foldings into 3 folds) so as to obtain 54 layers of fat.

The folded dough is rolled out until a thickness of about 3.5 mm is obtained.

The dough is cut into triangular-shaped pieces each weighing about 50 g, which are rolled up on themselves to give dough pieces.

The dough pieces are deep-frozen at −35° C.

D) Use of the Deep-frozen Dough Pieces.

When it is desired to prepare croissants from the dough pieces, the dough pieces simply have to be baked in an oven, directly after being taken out of the freezer. For example, the oven can be preheated to 215° C., the deep-frozen dough pieces placed therein, steam optionally injected into the oven in order to improve the brilliance of the croissants, and then baked for about 22 minutes. Croissants, ready to be consumed, are thus obtained. No discharge of fat is observed during the baking. The increase in volume during the baking, that is to say the ratio of the volume of the baked croissant to the volume of the deep-frozen raw croissant is of the order of 3 to 3.5.

Example 2 (comparative)

The procedure of Example 1 is repeated except that only one 3×3 folding is carried out so as to obtain 27 layers of fat.

On baking, the fat is discharged from the dough pieces and the croissants do not develop properly.

Example 3

Manufacture of Deep-frozen Raw Dough Pieces for Croissants from two Doughs

A) Basic recipe:

1) Yeast-free Dough:

1) Yeast-free dough:

| | | |
|---|---|---|
| 1000 grams of bread flour of DUO brand sold by the company CERES, Brussels, Belgium | ) ) ) | |
| 600 grams of water, | ) | standard formulation |
| 70 grams of sugar, | ) | |
| 10 grams of salt, | ) | |
| 5 grams of glucono-delta-lactone (sold by the company ROQUETTE) | ) ) | |
| 5 grams of TYLOSE ® (carboxymethyl-cellulose with a viscosity of 10 Pa · s sold by the company HOECHST) | ) ) ) ) | additives |
| 0.05 gram of lipase with an activity of 1200 LCA/gram (sold under the tradename 2212E by the company Rohm) | ) ) ) | |

2) Yeast dough:

| | | |
|---|---|---|
| 1000 grams of bread flour DUO | ) | |
| 600 grams of water | ) | |
| 75 grams of bakers' yeast (in the form of a compressed paste) | ) ) ) | standard formulation |
| 20 grams of salt | ) | |
| 5 grams of glucono-delta-lactone | ) | |
| 5 grams of TYLOSE | ) | |
| 0.05 gram of lipase "2212E" | ) | |
| 15 grams of a mixture of commercial baking improvers comprising an emulsifier, a hemicellulase and an amylase available under the name 1414/12 from the company CERES | ) ) ) ) ) | additives |

B) Preparation

1) Yeast-free Dough mix well all the ingredients, except the water, add water, knead for 5 minutes, leave to stand for 30 min in the refrigerator at 4° C.

2) Yeast Dough mix well all ingredients, except the water, the yeast and the salt, add the water and the yeast, then mix, add the salt, then knead.

It is advisable to ensure that the temperature of this dough does not exceed 20° C.

3) Preparation of the Dough Pieces a) 1st Method 1000 grams of yeast-free dough in sheet form are taken and 800 grams of margarine are spread over it. It is folded 1×3 (that is to say a folding into 3 folds), then the resulting folded and rolled flaky dough is rolled out to a thickness of about 7 mm.

1000 grams of yeast dough are in turn rolled out until a thickness of about 5 mm is obtained.

The flaky dough is placed over the yeast dough.

The whole is folded 2×3 (2 successive foldings into 3 folds each).

The dough is again folded 1×3, then 1×2.

The dough is rolled out until a thickness of about 3.5 mm is obtained.

The dough is cut into triangular-shaped pieces each weighing about 50 g, which are rolled up on themselves to give the dough pieces.

The dough pieces are deep-frozen at, for example, −35° C.

The total number of fat layers is 162.

The dough pieces are baked as in Example 1. Appetizing croissants of remarkable quality are obtained. The increase in volume during the baking is of the order of 5.

b) 2nd method 1000 grams of yeast-free dough in sheet form are taken.

1000 grams of yeast dough in sheet form are taken.

The sheet of yeast-free dough is placed over the sheet of yeast dough, then 800 grams of margarine are spread over the sheet of yeast-free dough.

The resulting laminated structure is folded as described in Example 1 to give 54 layers of margarine.

The dough is rolled out until a thickness of about 3.5 mm is obtained.

The dough is cut into triangular-shaped pieces each weighing about 50 g, which are rolled up on themselves to give dough pieces.

The dough pieces are deep-frozen at, for example, −35° C.

The total number of fat layers is 54.

The dough pieces are baked as in Example 1. Appetizing croissants of remarkable quality are obtained. The increase in volume during the baking is of the order of 5.

Example 4

The procedure of Example 3 is repeated except that the addition of the glucono-delta-lactone, Tylose and lipase additives is omitted.

Croissants are finally obtained, after baking the dough pieces, which are less developed than those obtained in Example 1, but of very satisfactory quality, superior to that of the products currently available on the market.

Example 5

Manufacture of Deep-frozen Raw Dough Pieces for Croissants from Yeast Dough Alone 1000 grams of the yeast dough of Example 1 are rolled out into sheet form and a layer of 300 grams of margarine is spread over it. It is folded 1×3 (that is to say a folding into 3 folds), then the resulting folded flaky yeast dough is rolled out to a thickness of about 7 mm.

The whole is folded 2×3 (2 successive foldings into 3 folds each).

It is again folded 1×3, then 1×2.

The dough is rolled out until a thickness of about 3.5 mm is obtained.

The dough is cut into triangular-shaped pieces each weighing about 50 g, which are rolled up on themselves to give the dough pieces.

The dough pieces are deep-frozen at, for example, −35° C.

The total number of fat layers is 162.

The dough pieces are baked as in Example 1. The croissants obtained are of a high quality, similar to that of the croissants obtained in Example 3.

It should be noted that it is possible to recycle the folded dough offcuts in a proportion which may be as high 10–15%, which contributes to improving the economic competitiveness of the invention.

The invention is designed both for professional bakers and for consumers.

It goes without saying that the embodiments described are merely examples and that they could be modified especially by the substitution of technical equivalents without, as a result, departing from the scope of the invention.

I claim:

1. A process for the manufacture of deep-frozen raw croissant dough pieces which can be directly baked without thawing or fermenting, which comprises the following steps:
   a) preparing a yeast dough containing flour, water, yeast, glucono-delta-lactone in an amount of 2 to 10 parts by weight per 1,000 parts by weight of flour, and a water-retaining agent selected from the group consisting of carboxymethylcellulose, derivatives of carboxymethylcellulose, guar gum, xanthan and an alginate, said water-retaining agent being present in an amount of 2 to 10 parts by weight per 1,000 parts by weight of flour;
   b) rolling out the yeast dough obtained in step (a) into sheet form and without subjecting said yeast dough to a fermentation step, applying a layer of fat thereon to provide a layered, intermediate product;
   c) folding the layered intermediate product obtained in step (b) so that the total number of fat layers is greater than 50;
   d) rolling out the folded dough until the desired thickness is obtained, and producing dough pieces from said dough; and
   e) deep-freezing the dough pieces without subjecting said dough pieces to a prior fermentation step.

2. The process as claimed in claim 1, wherein the total number of fat layers is between 80 and 500.

3. The process as claimed in claim 2, wherein the total number of fat layers is between 80 and 240.

4. The process as claimed in claim 1, wherein said yeast dough further contains a lipolytic enzyme selected from the group consisting of lipases and fatting acid esterases in an amount of 12 to 120 LCA units per kilogram of flour.

5. The process as claimed in claim 4, wherein a lipase is incorporated as lipolytic enzyme.

6. A process as claimed in claim 1, wherein during steps (a)–(e) said dough pieces are maintained at a temperature of no more than 20° C.

7. A process of preparing a bakery product made from bakery dough which comprises the steps of:
   (a) providing a directly-bakable, deep-frozen, raw croissant dough piece comprising a laminated structure which has not been subjected to fermentation steps, said laminated structure consisting essentially of a plurality of layers of yeast dough and a plurality of layers of fat, the number of fat layers being more than 50, said yeast dough containing flour, water, yeast, glucono-delta-lactone in an amount of 2 to 10 parts by weight per 1,000 parts by weight of flour, and a water-retaining agent selected from the group consisting of carboxymethylcellulose, derivatives of carboxymethylcellulose, quar gum, xanthan and an alginate, said water-retaining agent being present in an amount of 2 to 10 parts by weight per 1,000 parts by weight of flour, and
   (b) baking said raw dough piece directly without thawing or exposure to a fermentation step, thereby providing an edible bakery product.

8. A process as claimed in claim 7, wherein during step (b) said raw dough piece increases in volume by a factor of at least 3.

9. A process as claimed in claim 8, wherein said factor is up to 5.

10. A process as claimed in claim 7, wherein during step (a) said dough piece is maintained at a temperature of no more than 20° C.

* * * * *